April 11, 1944.  F. M. GUY  2,346,574
RESILIENT BUSHING
Filed Sept. 17, 1942
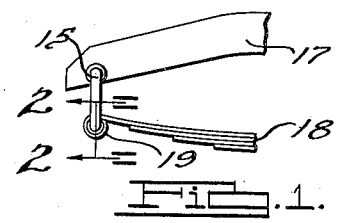
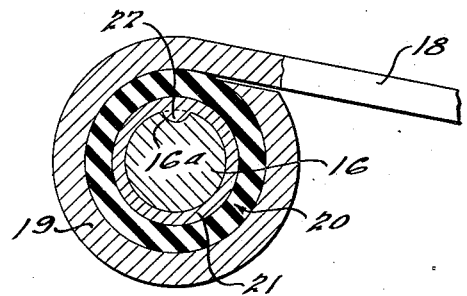
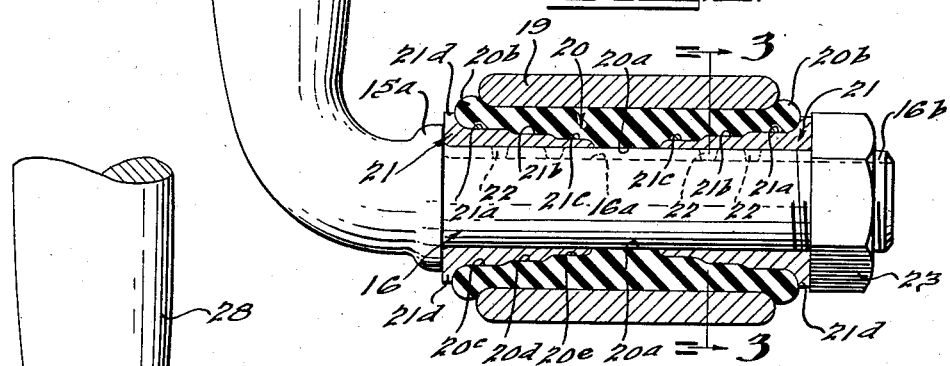
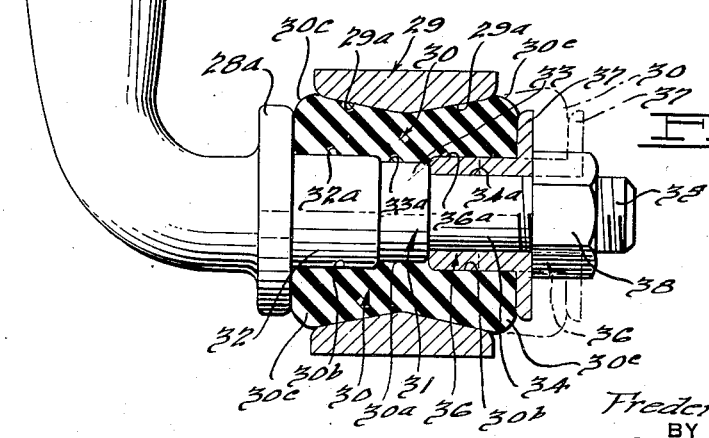
INVENTOR
Frederick M. Guy.
BY
Gray & Smith
ATTORNEYS.

Patented Apr. 11, 1944

2,346,574

UNITED STATES PATENT OFFICE 2,346,574

RESILIENT BUSHING

Frederick M. Guy, Detroit, Mich., assignor to Guy & Murton, Inc., Detroit, Mich., a corporation of Michigan Application September 17, 1942, Serial No. 458,635

4 Claims. (Cl. 287—85)

This invention relates to a resilient bushing, coupling, joints and the like. The present application is a continuation-in-part of my co-pending application, Serial No. 324,388, filed March 16, 1940.

One of the objects of the present invention is to provide an improved resilient bushing in which the constituent parts thereof may be shipped separately or in disassembled condition and assembled by the mechanic on the job with ease and facility.

Another object of the invention is to provide an improved bushing whose resilient element or elements is or are uniformly loaded.

Another object is to provide a resilient bushing or coupling in which the load or force exerted upon the resilient element thereof may be controlled at will to suit the condition attendant upon the particular use or installation of the bushing or coupling.

Another object of the invention is to provide an improved bushing or the like of composite structure including a resilient member interposed between inner and outer non-resilient members, in which the pressure or force applying face or faces of the inner member is or are located in a plane or planes substantially parallel to the axis of said inner member.

A further object of the present invention is to provide an improved resilient coupling or bushing in which longitudinal or axial, as well as radial or transverse movements of the component parts thereof, are cushioned.

Another object of the invention is to provide an improved coupling or bushing assembly of the resilient type in which the resilient element or elements can be preformed or molded to substantially their finished proportions or dimensions, thus greatly facilitating the manufacture and assembling of the parts of the couplings or bushings.

A further object of the invention is to provide an improved resilient coupling or bushing having longitudinally movable means engageable with the resilient element or elements of the coupling whereby to build up compression forces within said element or elements without exerting twisting or turning forces thereupon.

A further object of this invention is to provide a bushing of improved character in which lateral stability of the parts is provided for and in which the amount of end play of the parts may be controlled.

Another object of the invention is to provide an improved coupling, joint, or bushing possessing the foregoing features and advantages which is of relatively simple character comprising a minimum of parts, and one which may be produced in quantities at relatively low manufacturing cost.

The foregoing and other objects and advantages of the invention will appear from the following description and appended claims when considered in connection with the accompanying drawing forming a part of this specification wherein similar reference characters designate corresponding parts in the several views.

In said drawing:

Fig. 1 is a fragmentary side elevation showing one application of the improved bushing, coupling or joint structure embodying the present invention.

Fig. 2 is an enlarged sectional view, partly in elevation, taken substantially along the line 2—2 of Fig. 1, looking in the direction of the arrows.

Fig. 3 is a sectional view taken substantially along the line 3—3 of Fig. 2, looking in the direction of the arrows; and Fig. 4 is a view similar to Fig. 2 and illustrating a somewhat modified form of the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now particularly to Figs. 1, 2 and 3 of the drawing, the present embodiment of the invention is shown in conjunction with a vehicle spring shackle construction in which a shackle arm 15 having an offset end portion which acts as a bolt, stud or pin 16, depends from a vehicle frame member shown as a whole at 17, with the portion 16 extending through and being positioned within the eye, sleeve portion or casing 19 of a leaf spring 18. An enlargement or external annular bead 15a is, as shown, located substantially at the juncture of the shackle portions 15 and 16, see particularly Fig. 2. As shown in the present form, the bolt, pin or stud 16 is straight or cylindrical and terminates at its free end in a threaded portion 16b. The member 16 is also provided with a longitudinally extending slot, groove or keyway 16a.

The bushing, coupling or joint structure of the present invention includes a sleeve, bushing, or other substantially cylindrical member 20 which is preferably formed of rubber or other elastic and relatively resilient, distortable, or mobile material which is preferably preformed or shaped prior to assembly or installation. This sleeve member 20 is usually first inserted in the eye or casing 19 after which the shackle bolt or pin 16 is inserted through the sleeve, the parts being in telescoped relation when assembled, as seen. As best shown in Figs. 2 and 3, the external surface or face of the rubber sleeve 20 is, in the present embodiment, substantially cylindrical so as to engage, throughout its length, the internal cylindrical surface or face of the spring eye or casing member 19.

The central portion of the distortable sleeve or member 20 is enlarged or relatively thicker than the remaining portions thereof and presents a flat surface or face 20a which is adapted to engage the cylindrical face or surface of the pin or stud 16. At opposite sides of the central portion the bushing 20 is provided with stepped portions presenting internal faces or surfaces 20c, 20d and 20e. The central portion of the rubber bushing 20 has a substantially snug fit with the eye or sleeve 19 and with the shackle bolt or pin 16, the remainder of the length of the bushing being in contact at its outer surface with the eye or sleeve 19 but having its inner faces 20c, 20d and 20e normally out of contact with the stud or pin 16.

Such an arrangement and formation of parts permits the application to the bolt or stud 16 of a pair of wedge members each of which is shown as a whole at 21. As shown, these wedge members are in the form of cylinders or rings. Each wedge member has at its outer end an annular flange 21d and is also provided with internal lugs or projections 22. The lugs 22 are adapted to engage in the groove 16a to prevent rotation of the wedge 21 relative to the shank or bolt member 16. Each wedge member 21 is provided in its external face or surface with a plurality of stepped portions 21a, 21b and 21c. It is to be noted that the over-all diameter of the wedge adjacent its inner end is less than that adjacent its outer end and flange 21d. It is also to be noted that all of the faces or surfaces 21a, 21b and 21c, when the parts are assembled, extend in planes which are substantially parallel to the axis of the stud 16.

One method of assembling the parts shown in Fig. 2 is substantially as follows: First, the wedge member 21 to the left of this figure is slipped over the bolt or stud 16 until its flange 21d engages the enlargement 15a of the shackle arm. The rubber sleeve member 20 is then slipped over the assembled parts 16 and 21 and the whole inserted in the spring eye or casing 19. Thereafter, the second wedge member 21, namely the one at the right of Fig. 2, is slipped over the stud or shank 16 and the nut 23 threaded upon the end 16b of said stud. As the nut is tightened down, the parts will be forced together into intimate relationship, with the stepped faces of the wedge members 21 engaging the corresponding faces of the rubber or resilient sleeve member or block 20. Pressure applied by tightening the nut 23 will produce the annular beads 20b located at opposite ends of the rubber bushing or sleeve member and which are interposed between the annular flanges 21d and the adjacent edges or ends of the spring end, eye, or casing member 19. The beads 20b thus produced, provide lateral stability of the parts and serve to control the amount of end play of said parts. They likewise prevent any metal-to-metal contact between the parts at the opposite ends of the coupling.

It will be understood that the further tightening down of the nut 23 will drive the wedge members 21 inwardly toward each other and against the central enlarged portion of the rubber bushing. This action will set up compressive forces in said rubber bushing from its approximate longitudinal central portion outwardly in opposite directions to effect an intimate binding action on the parts of the coupling.

Referring now particularly to Fig. 4 of the drawing, there is shown therein a somewhat modified form of structure embodying the present invention. As in the preceding form of the invention, the present embodiment is also particularly well adapted for use in conjunction with a vehicle spring shackle construction in which a shackle arm 28, having an offset end portion providing a bolt, stud or pin shown as a whole at 31, depends from a vehicle frame member (not shown). The bolt or stud 31 extends through and is positioned within a spring end, eye member, or ring 29 having a straight and substantially cylindrical outer face and an inner face or surface substantially in the form of a reverse taper 29a. The shackle arm 28 is provided with an enlarged portion or annular rib 28a which is located at the juncture of the arm and the shank or bolt portion 31.

The structure of the present form of the invention includes a sleeve, bushing or a block member of substantially cylindrical form shown as a whole at 30. This member is preferably formed of rubber or other elastic and relatively compressible, distortable, or mobile material which is preferably preformed or shaped prior to assembly or installation. The rubber member 30 has a bore which is of a lesser diameter at its central portion or section 30a than at and adjacent its opposite end portions or sections 30b. The outer surface or face of the member 30 is preferably shaped to conform to the inner surface or reverse taper 29a of the eye or ring member 29.

The bolt or pin 31 is provided with stepped portions or sections of different diameters. The section or portion having the greatest diameter is located adjacent the bead 28a and is indicated at 32. The next adjacent section is stepped down in diameter to provide an intermediate portion 33. The pin is further reduced in diameter to provide an inner reduced portion or section 34 which terminates at its free end in a threaded section 35. It is to be noted that the outer surfaces 32a, 33a and 34a of the stepped portions of the bolt or shank member 31 are all arranged in planes which are substantially parallel to the axis of said bolt or pin. Likewise, the inner surfaces 30a and 30b of the rubber bushing member 30 are likewise substantially parallel to the axis of the bolt or member 31.

For the purpose of subjecting the rubber bushing member 30 to compressive forces from its central portion outward toward its opposite ends, the portion or section 34 of the bolt is adapted to receive and support a pressure applying sleeve-like member 36 having at its outer end a flange 37. The member 36 has an exterior face or surface 36a which extends in a plane which is substantially parallel to the axis of the member 31.

It will be understood that the member or sleeve 36 is adapted to be inserted in the space between the shank portion 34 and the adjacent inner face or surface 30b of the rubber bushing by sliding the sleeve or member 36 over the shank portion so that it fits relatively snugly within said space.

One manner in which the parts shown in Fig. 4 may be assembled is substantially as follows: After the rubber bushing 30 has been assembled with the bolt or shank member 31, the parts are inserted within the eye or ring-like member 29. The pressure applying metal sleeve 36 is then slipped over the bolt portion 34 and pushed into the space between said portion and the rubber bushing face 36a. Thereupon the nut 38 is applied to the threaded end 35 of the pin or stud and tightened down. This action causes the flange 37 to engage the rubber member 30 to move its adjacent portion from its broken line to its full line position and to force the sleeve-like pressure applying member 36 into contact with the adjacent end or abutment on the central portion 33 of the stud, to thereby apply compressive forces to the rubber bushing member or block 30 from the central or substantially the central portion thereof outwardly in the direction of the opposite ends of said member. The application of such forces will also produce bulges or enlargements 30c at the opposite ends of the rubber member 30, which, as shown, are interposed between the enlargement 28a and the adjacent end of the eye member 29 on the one hand and between the flange 37 of the member 36 and the adjacent end of the eye member 29 on the other hand. The beads thus produced provide lateral stability of the parts and serve to control the amount of end play of said parts. They also prevent any metal-to-metal contact between the parts at the opposite ends of the coupling. Thus, when the parts are assembled, the member 36, along with the portions 32 and 33 of the bolt or pin 31, functions to set up radial compression forces in the rubber bushing 30 from its approximate central portion outwardly in opposite directions toward its ends.

It is to be noted that the portions or surfaces 32a, 33a and 36a provide faces which engage the adjacent portions of the resilient bushing member 30 on lines which are substantially parallel to the axis of the bolt, stud or pin 31.

Attention is directed to the fact that in both forms of the invention above described, the force applying member or members are provided with faces which engage the resilient member or members of the bushing structure on lines which extend in planes which are substantially parallel to the axis of the bolt or stud member of the structure. In Fig. 2, this is accomplished by the provision of stepped portions formed on the wedge members 21, whereas in the form shown in Fig. 4, the stud or bolt 31 itself is provided with a plurality of stepped portions or sections having surfaces extending in planes which are parallel to the axis of the stud and by means of an adjustable pressure applying member 36 whose outer, as well as inner surface extends in a plane which is also parallel to the axis of the stud or pin 31.

I claim:

1. A resilient bushing comprising a sleeve, a stud located within and extending through said sleeve, a rubber member surrounding the stud and interposed between said stud and sleeve an annular flange on said stud, a force applying member located on said stud and having one face abutting against said flange, and a movable force applying member carried by the stud and adjustable longitudinally thereon to build up compression forces in said rubber member in radial directions from its central portion progressively toward its opposite outer ends, said force applying members each having a plurality of stepped substantially cylindrical faces extending in planes substantially parallel to the axis of said stud on radii which are decreased from the outer ends progressively toward the central portion of the bushing, and an annular collar extending radially outward adjacent the stepped substantially cylindrical face of largest diameter.

2. A resilient bushing comprising a sleeve, a stud located within and extending through said sleeve, a preformed rubber member surrounding the stud and interposed between said stud and sleeve, said stud having stepped portions of different diameters, and a substantially cylindrical force applying member carried by one of said stepped portions and adjustable longitudinally thereon whereby to set up compressive forces in said rubber member from the approximate longitudinal center thereof outwardly in opposite directions to effect an intimate binding contact between the parts, said stepped portions and said force applying member having faces engageable with said rubber member on lines extending substantially parallel to the axis of said stud.

3. A resilient bushing comprising a sleeve, a stud located within and extending through said sleeve, said stud having an annular flange adjacent one end thereof, an enlarged shoulder adjacent said flange and a reduced portion extending longitudinally from said shoulder, and a force applying member comprising an annular flange and a longitudinal sleeve extending over and carried by the said reduced portion of the stud and adjustable longitudinally thereon toward the said annular flange and enlarged shoulder on said stud, a preformed resilient member deformable under pressure and surrounding the enlarged shoulder on said stud and the longitudinal sleeve portion of said force applying member and filling the space between said stud, force applying member and first named sleeve, the longitudinal adjustment of said force applying member acting to build up compression forces in said resilient member in radial directions from its central portion progressively toward its opposite outer ends.

4. A resilient bushing comprising a sleeve, a stud located within and extending through said sleeve, a preformed rubber member surrounding the stud and interposed between said stud and sleeve, said stud carrying an annular flange extending radially outwardly therefrom adjacent one end thereof, and a force applying member comprising an annular flange and a cylindrical body portion adapted to be pressed between the stud and the said preformed rubber member and carried by the other end of said stud for adjusted movement longitudinally thereon toward said annular flange on the stud and in cooperation with said flange to build up compression forces in said rubber member in radial directions from its central portion progressively toward its opposite outer ends, said force applying member and said stud having faces extending in planes substantially parallel to the axis of said stud.

FREDERICK M. GUY.